Figure 1:
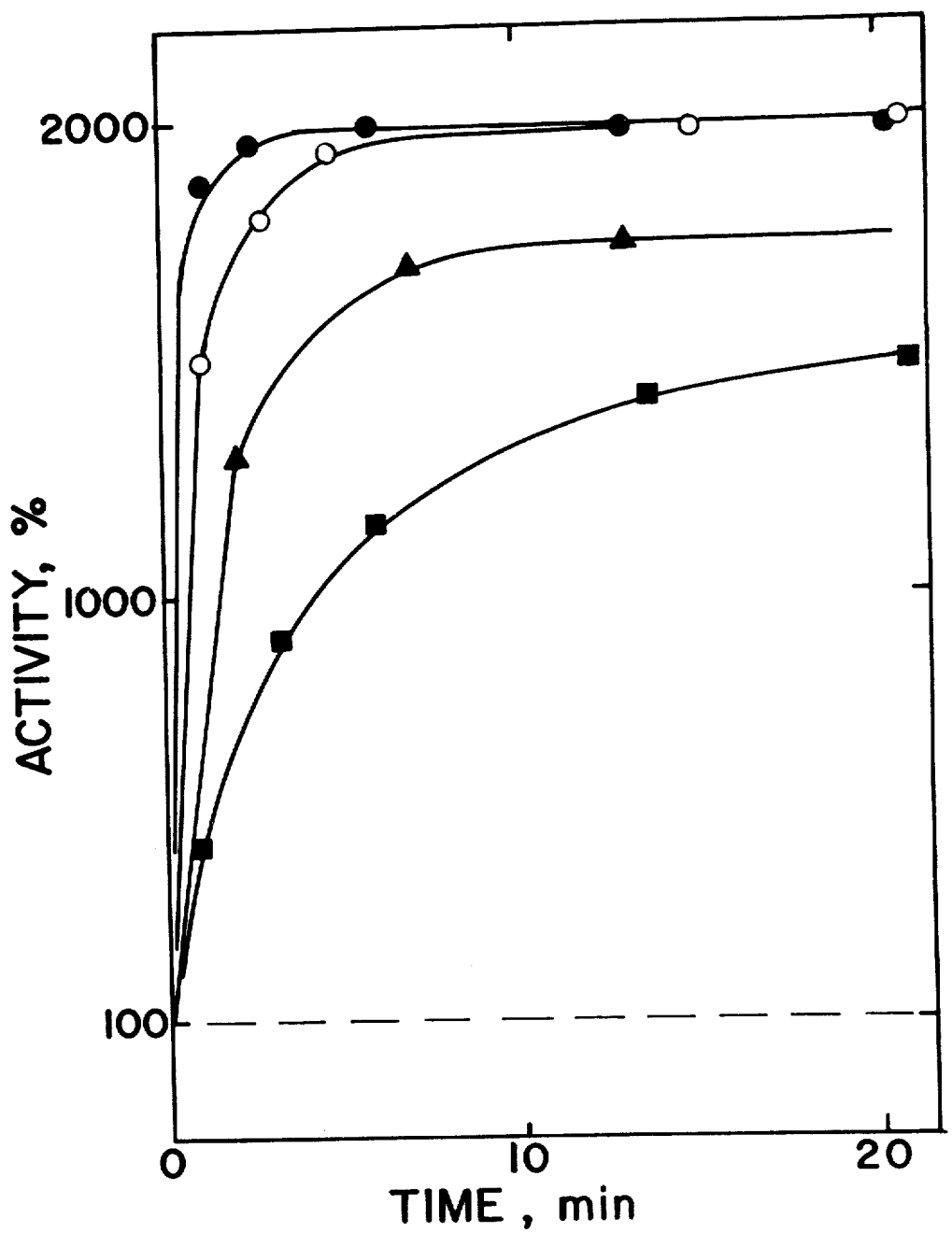

United States Patent [19]
Blumberg et al.

[11] 3,886,042
[45] May 27, 1975

[54] ACYLATION OF PROTEOLYTIC ENZYMES

[76] Inventors: Shmaryahu Blumberg; Barton Holmquist; Bert L. Vallee, all of c/o Biophysics Research Laboratory, Peter Bent Brigham Hospital, Boston, Mass. 02115

[22] Filed: Mar. 13, 1974

[21] Appl. No.: 450,772

[52] U.S. Cl. .................................. 195/62; 195/68
[51] Int. Cl. ............................................ C07g 7/02
[58] Field of Search ............... 195/63, 68, DIG. 11; 260/112 R

[56] References Cited
UNITED STATES PATENTS
3,770,587  11/1973  Hamsher et al. ................... 195/63

*Primary Examiner*—Lionel M. Shapiro
*Attorney, Agent, or Firm*—Morton, Bernard, Brown, Roberts & Sutherland

[57] ABSTRACT

A proteolytic enzyme containing one or more tyrosyl, lysyl, threonyl, seryl, histidyl, or cysteinyl residues, e.g. thermolysin, is superactivated as regards hydrolase activity by acylating the enzyme with an acylating agent which will provide an acyl group of the formula:

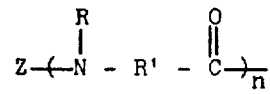

wherein Z is hydrogen or an organo blocking group, each

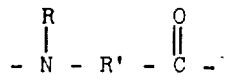

is an amino acid residue, and n is at least 1. Examples of suitable acyl groups are acetylalanyl, acetylphenylalanyl, and β-phenylpropionylphenylalanyl.

32 Claims, 2 Drawing Figures

The effect of pH on the changes in activity of thermolysin on acylation with 5 mM Ac-Phe-Osu ■ – pH 9.0   ▲ – pH 7.5
○ – pH 8.0   ● – pH 8.5

The effect of concentration of reagent on the changes in activity of thermolysin upon acylation with Ac-Phe-Osu at pH 8.0

▼ - 0.25 mM   ▲ - 0.5 mM
■ - 1.0  mM   ○ - 2.5 mM
● - 5    mM

ACYLATION OF PROTEOLYTIC ENZYMES

This invention relates to modified proteolytic enzymes. More particularly, it relates to the acylation of proteolytic enzymes so as to increase their hydrolase activity.

Proteolytic enzymes which exhibit a hydrolase type of enzymatic activity have many and varied uses, including, for example, usefulness as additives to laundry detergent compositions; as catalysts in the chemical modification of steroids; in converting starch or cellulose to soluble sugars, thence to alcohol; in converting carbon dioxide, nitrogen, and hydrocarbons into amino acids and/or proteins; in making cheese; and in degrading waste materials. These enzymes contain amino acid residues, or peptide linkages. It has now been found that the hydrolase activity of such an enzyme can be enhanced by acylating it with an acyl group of the formula

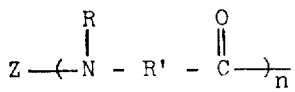

wherein Z is an organo blocking group, each

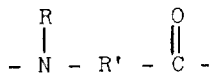

is an amino acid residue, and n is at least 1.

The ability to substantially enhance the native hydrolase activity of a proteolytic enzyme not only provides an economic advantage for existing chemical processes which employ such enzymatic activity, but may provide the means by which those processes, which have been heretofore conducted in a batchwise manner, can be converted, with practicality, to a semi-continuous or continuous operation.

The enzyme subject for the modification treatment of the present invention contains one or more amino acid residues selected from the group consisting of tyrosyl (Tyr, from tyrosine), lysyl (Lys, from lysine), threonyl (Thr, from threonine), seryl (Ser, from serine), histidyl (His, from histidine), and cysteinyl (Cys, from cysteine). The enzyme may be bacterial, plant, or mamalian, but is preferably bacterial. The enzyme can be alkaline, neutral, or acidic, but is preferably neutral. Metalloproteases are preferred, especially those containing zinc, and most especially those containing zinc and calcium, e.g., the neutral proteases produced by the fermentation of the microorganisms *Bacillus thermoproteolyticus*, *Bacillus subtilis*, *Bacillus megaterium*, *Aeromonas proteolytica*, and *Bacillus cereus*. In the tyrosyl-containing enzymes that have been superactivated by the treatment of the present invention, all indications are that the site of the acylation is the phenolic oxygen of the tyrosyl residue.

The Z moiety of the acyl group that is used to modify proteases in accordance with the present invention is hydrogen or, more preferably, an organo group that blocks the amino group of the amino acid residue, preventing the amino group from reacting with another molecule of the acylating agent. When Z is an organo blocking group, it preferably contains 1 to 30 carbon atoms, e.g., about 2 to 12 carbon atoms, and is preferably either hydrocarbyl, hydrocarbylcarbonyl, or hydrocarbylsulfonyl, each of which can be substituted or unsubstituted. Preferred hydrocarbyl moieties are aliphatic (e.g., alkyl) and aryl-substituted aliphatic (e.g., phenyl-substituted alkyl).

If substituted hydrocarbyl, hydrocarbylcarbonyl, or hydrocarbylsulfonyl blocking groups are used as Z, examples of suitable substituents thereon include nitro groups (e.g., as in 2,4-dinitrophenyl (DNP)), halo groups (e.g., as in 4-iodophenyl), dihydrocarbylamino groups (e.g., as in dansyl (Dns), i.e., 5-dimethylaminonaphthalene-1-sulfonyl), azo groups, and chelated or covalently bound metal atoms.

The

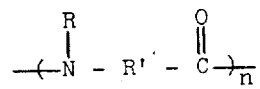

moiety of the acyl group that is used to modify proteases in accordance with the present invention is, as indicated above, one or more known amino acid residues (including substituted amino acid residues). Where this moiety is composed of a plurality of amino acid residues, i.e., a polypeptide group, the amino acid residues may be the same, as in Ala-Ala (alanyl-alanyl), or different, as in Gly-Phe (glycyl-phenylalanyl).

The value of n is at least 1, but n is preferably low enough that the acylating agent will have a sufficient solubility at 25°C. in a water/dimethylformamide solution (95 vol. percent $H_2O$/5 vol. percent DMF) to enable one to prepare at least a 0.1 mM solution of the agent. Generally, n will have a value of from 1 to 10, preferably from 1 to 3.

The amino acid residues are preferably derived from alpha-amino acids, most preferably those which are monocarboxylic, e.g., such as glycine, alanine, valine (Val), tryptophan (Trp), isoleucine (Ile), tyrosine, and phenylalanine. If substituted, the example substituents on the amino acid residue are those selected from the group consisting of acetyl, benzyl (Bzl), dinitrophenyl, dinitrophenylamino, and iodo. The amino acid residues may be optically active (D or L) or may be racemates.

The acylation process of the present invention is effected by contacting the protease under reaction conditions with an acylating agent of the formula:

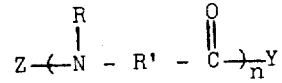

wherein

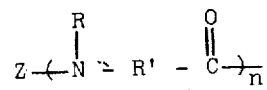

is as defined above, and Y is an organo group that is replaced by the protease molecule during the acylation reaction. Any organo group that is a good "leaving group", i.e., is joined to the carbonyl carbon atom of

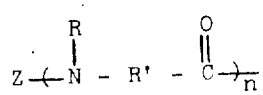

by a weak covalent bond, and will not interfere with the acylation reaction or with the desired product, can be used. Generally preferred Y groups are those which in aqueous solution will exhibit a pKa value below about 10, preferably about 8 or less. Most preferred Y groups are
N-oxysuccinimide

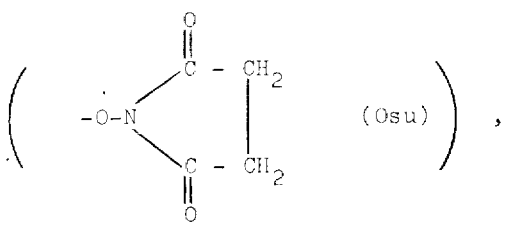

N-imidazole

and alkyl carbonate ester

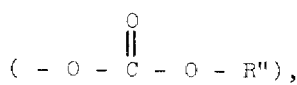

wherein the alkyl group (R") has 1 to 7, preferably 2 to 4, carbon atoms.

The acylating agent can be prepared in advance of the enzyme modification reaction by well known methods, or it can be prepared in situ by mixing the necessary reactants with the protease. Also, if desired, the acylating agent may be prepared with a mixture of Y groups, and/or a mixture of Z groups, and/or a mixture of

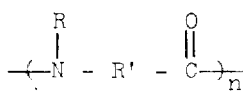

groups.

The pH at which the acylation reaction is advantageously conducted will vary, depending upon the particular enzyme employed. With neutral protease, however, a pH within the range of about 6 to 10, e.g., about 7 to 9, is generally preferred.

The acylation reaction is advantageously conducted with the enzyme being in solution in an appropriate aqueous buffer solution, e.g., a buffer solution of sodium chloride, calcium chloride, and Tris (tris(hydroxymethyl)aminomethane), with or without sodium bromide. The acylating agent is likewise preferably dissolved, e.g., in a suitable organic solvent such as dimethylformamide or dioxane.

The acylation reaction proceeds well enough at room temperature, but elevated or lower temperatures can be employed if desired, e.g., within the range of about 0° to 50°C. Reaction time will vary, depending upon the particular reactants employed, the temperature used, etc., but the reaction will generally be complete within about 1 minute to 8 hours, most often about 5 to 15 minutes.

The invention will be better understood by referring to the following examples, which are offered for illustration purposes only. Sources of the proteases referred to in the examples were as follows:

Thermolysin: Calbiochem's A grade.
*B. subtilis:* Miles Lab's. var. amilosaccariticus.
*B. megaterium:* Monsanto Company.
*B. cereus:* Monsanto Company.
*Aeromonas proteolytica:* J. M. Prescott, Texas A&M University.

EXAMPLE I

To a stirred solution of thermolysin (2 mg.) in 0.2 M NaCl, 0.01 M $CaCl_2$, 0.001 M Tris, pH 8.0 (2 ml.) at 25°C. was added 40 μl of a solution of Ac-Phe-Osu (acetyl-L-phenylalanyl-N-oxysuccinimide) acylating agent in dimethylformamide (0.1 M), and the pH was adjusted to 8.0 in a pH-stat by the addition of sodium hydroxide (0.1 N). After 10 min., the product mixture was gel-filtered on a Biogel P-4 column (0.9 × 20 cm.) that was equilibrated and eluted with 0.2 M NaCl, 0.01 M $CaCl_2$, 0.002 M Tris, pH 7.1, and kept at 4°C.

The acylated enzyme exhibited 20-fold higher hydrolase activity than the native enzyme as assayed with FAGLA (furylacryloyl-Gly-Leu-$NH_2$) by the method described by Feder and Schuck, Biochemistry (1970), Vol. 9, pp. 2784-2791. This method involves spectrophotometric assay following the decrease in absorbance at 345 mm. on hydrolysis of 1mM FAGLA (Cyclo Chem. Corp.) in 0.1 M NaCl, 0.05 M Tris, 0.01 M $CaCl_2$, pH 7.5. Hydrolysis of substrate, in this and the following examples, followed first order kinetics for at least two half lives. (The rate constant expressed as moles substrate hydrolyzed per unit absorbance of protein ($A_{280}$) per minute was 19 for the thermolysin, 5 for the *B. subtilis* enzyme used in examples described hereinafter, 30 for the Aeromonas enzyme used in examples described hereinafter, and 9 for the *B. megaterium* enzyme used in examples described hereinafter.) The assay results for various acylated enzymes of the present invention are reported hereinafter in Table I.

The acylated enzyme of this example exhibited high stability in the elution buffer (0.2 M NaCl, 0.01 M $CaCl_2$, 0.002 M Tris, pH 7.1) at 4°C. It lost less than 5 percent of its activity per 24 hours of incubation. The activity of the acylated enzyme can be reversed to that of the native enzyme upon deacylation with strong nucleophiles. In 0.1 M $NH_2OH$, 0.015 M Tris, pH 7.5 at 25°C., the half-life of the reversal process is about 10 min.

Figure 2:
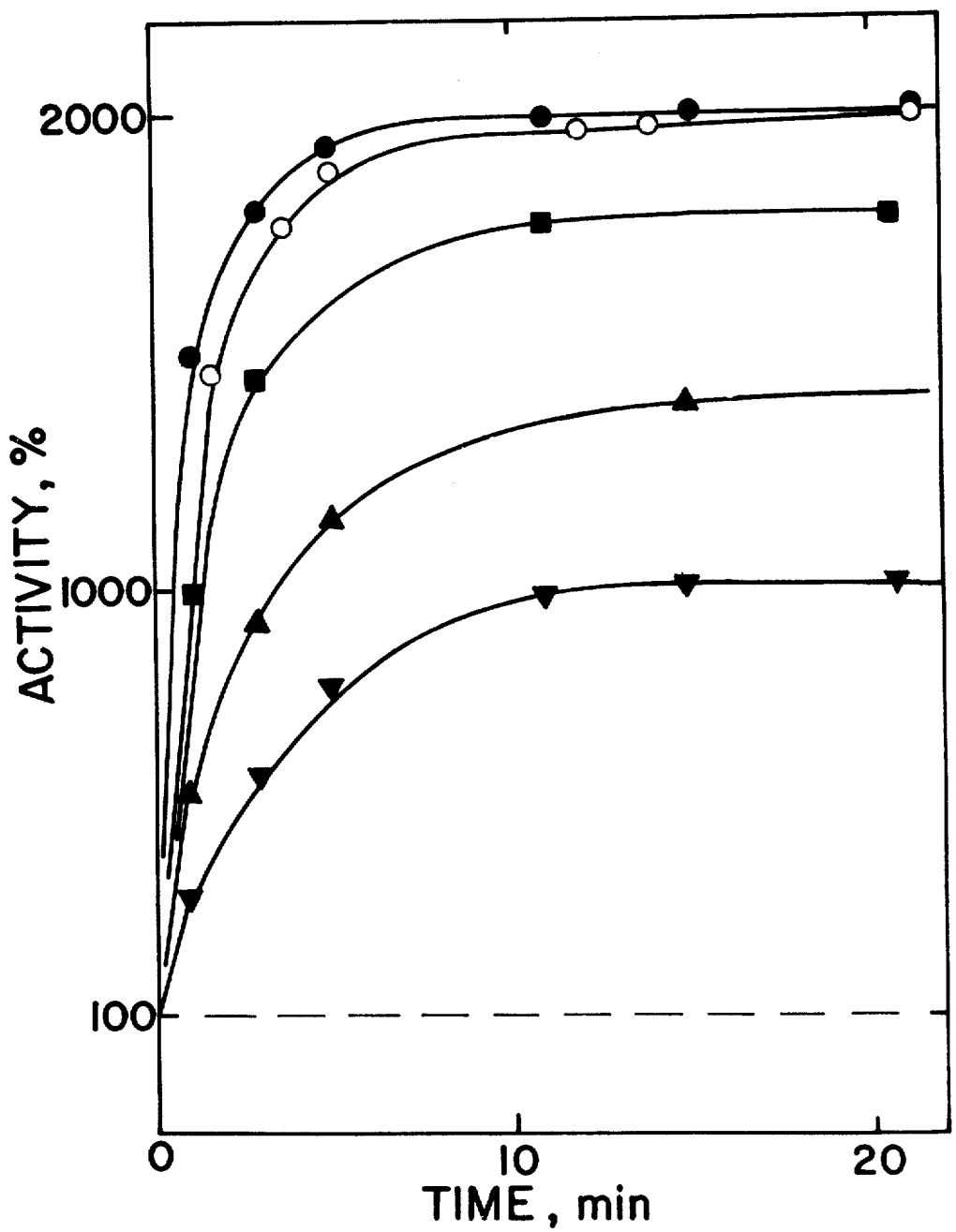

The effect of pH and reagent concentration on the rate and extent of the acylation (as measured by the protease activity on FAGLA) is shown in enclosed FIGS. 1 and 2.

EXAMPLE II

A stirred solution of Aeromonas proteolytica neutral protease (2.5 mg.) in 0.2 M NaCl, 0.01 M $CaCl_2$, 0.002 M Tris at 25°C. was brought to pH 8.0 in the pH stat by the addition of sodium hydroxide (0.1 N). 40 μl of a solution of Ac-Phe-Osu in dimethylformamide (0.075 M) was added and the pH maintained at 8.0 for 8 min.

The product was gel-filtered on a Biogel P-4 column that was equilibrated and eluted with 0.2 M NaCl, 0.01 M CaCl$_2$, 0.002 M Tris, pH 7.1, and kept at 4°C.

The acylated enzyme was 11-fold more active than the native enzyme towards FAGLA, and was highly stable in the elution buffer (0.2 M NaCl, 0.01 M CaCl$_2$, 0.002 M Tris, pH 7.1) at 4°C., losing less than 5 percent of its activity in 24 hours.

EXAMPLE III

A stirred solution of *B. subtilis* neutral protease (2 mg.) in 0.2 M NaCl, 0.01 M CaCl$_2$, 0.002 M Tris at 25°C. was brought to pH 8.0 in the pH-stat by the addition of sodium hydroxide (0.1 N). 40 μl of a solution of Ac-Tyr(Bzl)Osu (acetyl-(O-benzyl)tyrosyl-N-oxysuccinimide) in dimethyl formamide (0.025 M) was then added and the pH maintained at 8.0 for 6 min. The product was gel-filtered on a Biogel P-4 column (0.9 × 20 cm.) that was equilibrated and eluted with 0.2 M NaCl, 0.01 M CaCl$_2$, 0.002 M Tris, pH 7.1.

The hydrolase activity of the acylated enzyme as assayed with FAGLA was 16-fold higher than that of the native enzyme.

EXAMPLE IV

To a stirred solution of *B. megaterium* neutral protease (1 mg.) in 0.2 M NaCl, 0.01 M CaCl$_2$, 0.002 M Tris, pH 8.0, at 25°C., 40 μl of Ac-Trp-Osu (acetyl-L-tryptophanyl-N-oxysuccinimide) solution in dimethylformamide (0.5 M) was added and the pH maintained at 8.0 in the pH-stat by the addition of sodium hydroxide (0.1 N). After 8 min., the product was gel-filtered on a Biogel P-4 column (0.9 × 20 cm.) that was equilibrated and eluted with 0.2 M NaCl, 0.01 M CaCl$_2$, 0.002 M Tris, pH 7.1, and kept at 4°C.

The acylated enzyme exhibited a 10-fold higher activity in the standard FAGLA assay than that of the native enzyme.

EXAMPLE V

To a solution of thermolysin (2.5 mg.) in 0.2 M NaCl, 0.12 M NaBr, 0.01 M CaCl$_2$, 0.001 M Tris, pH 7.5 (2 ml.) at 25°C. was added 40λ of C$_6$H$_5$—CH$_2$—CH$_2$—CO-Phe-imidazole (β-phenylpropionyl-ζ-phenylalanyl-N-imidazole) solution in dimethylformamide (0.05 M) and the pH was maintained at 7.5 in the pH-stat by the addition of sodium hydroxide (0.1 N). After 30 min., the mixture was gel-filtered on a BiogelP-4 column (0.9 × 20 cm.) that was equilibrated and eluted with 0.2 M NaCl, 0.01 M CaCl$_2$, 0.002 M Tris, pH 7.5, and kept at 4°C.

The acylated enzyme product exhibited hydrolase activity 15 fold higher than that of the native enzyme when assayed with FAGLA. The product is stable in the elution buffer (0.2 M NaCl, 0.01 M CaCl$_2$, 0.002 M Tris, pH 7.1) at 4°C. It lost less than 5 percent of its activity per 24 hours of incubation. The activity of the product can be reversed to that of the native enzyme by deacylation with strong nucleophiles. In 0.1 M NH$_2$OH, 0.015 M Tris, pH 7.5, at 25°C., the half-life of the reversal process is about 8 min.

EXAMPLE VI

Dnp-Gly-Phe (N-dinitrophenylglycylphenylalanine) (50 mg.) and triethylamine (15 μl) were dissolved in ice-cold dimethylformamide (2 ml.). Ethylchloroformate (10 μl) was added and the solution was kept at 0°C. for 10 min. 40 μl of this solution was added to a solution of thermolysin (2 mg.) in 0.2 M NaCl, 0.01 M CaCl$_2$, 0.001 M Tris kept at 25°C. and at pH 7.5 in the pH-stat by the addition of sodium hydroxide (0.1 N). After 20 min., the product was gel-filtered on a Biogel P-4 column (0.9 × 20 cm.) that was equilibrated and eluted with 0.2 M NaCl, 0.01 M CaCl$_2$, 0.002 M Tris, pH 7.1, and kept at 4°C.

Activity of the acylated enzyme product was 15-fold higher than that of the native enzyme as assayed with FAGLA. The acylated enzyme in 0.2 M NaCl, 0.01 M CaCl$_2$, 0.002 M Tris, pH 7.1, at 4°C. loses only 5 percent of its activity in 24 hours. The product is yellow in color due to the dinitrophenyl-Gly chromophore covalently bound to the enzyme.

EXAMPLE VII

A solution of thermolysin (2 mg.) in 0.2 M NaCl, 0.01 M CaCl$_2$, 0.0001 M Tris and 0.070 M C$_6$H$_5$CH$_2$CH$_2$—CO-Phe (2 ml.) was brought in the pH-stat to pH 7.0 by the addition of sodium hydroxide (0.1 N). 20 μl of a solution of ethylchloroformate in dioxane (0.4 M) was added and the pH kept at 7.0 for 60 min. After that period, the product was gel-filtered on a Biogel P-4 column that was equilibrated and eluted with 0.2 M NaCl, 0.01 M CaCl$_2$, 0.002 M Tris, pH 7.1. The product was 11-fold more active than the native enzyme when assayed with FAGLA.

EXAMPLE VIII

To a stirred solution of thermolysin (2 mg.) in 0.2 M NaCl, 0.01 M CaCl$_2$, 0.001 M Tris and 0.060 M C$_6$H$_5$CH$_2$CH$_2$CH-Phe (2 ml.) at pH 6.5 and 25°C. was added 40 ml. of diethylpyrocarbonate (DEP) in dioxane (0.8 M), and the pH was kept at 6.5 for 60 min. The product was gel-filtered on a Biogel P-4 column (0.9 × 10 cm.) that was equilibrated and eluted with 0.2 M NaCl, 0.01 M CaCl$_2$, 0.002 M Tris, pH 7.1, and kept at 4°C.

The acylated enzyme exhibited 8-fold higher activity than the native enzyme, as assayed with FAGLA under the standard conditions employed.

EXAMPLE IX

To a stirred solution of thermolysin (2 mg.) in 0.2 M NaCl, 0.01 M CaCl$_2$, 0.001 M Tris, pH 8.0 (2 ml.) at 25°C. was added 40 μl of a solution of L-phenylalanyl-N-oxysuccinimide hydrobromide acylating agent in dimethylformamide (0.1 M), and the pH was adjusted to 8.0 in a pH-stat by the addition of sodium hydroxide (0.1 N). After 10 min., the product mixture was gel-filtered on a Biogel P-4 column (0.9 × 20 cm.) that was equilibrated and eluted with 0.2 M NaCl, 0.01 M CaCl$_2$, 0.002 M Tris, pH 7.1, and kept at 4°C. The acylated enzyme exhibited 6-fold higher hydrolase activity than the native enzyme as assayed with FAGLA.

TABLE I

The Effect of Acylation on the Activity of Neutral Proteases

| Acyl Group* | B. thermoproteolyticus Enzyme | B. Subtilis Enzyme | B. Megaterium Enzyme | Aeromonas Proteolytica Enzyme | B. Cereus Enzyme |
|---|---|---|---|---|---|
| | Activity Ratio (Acylated/Native) | | | | |
| Ac-Ala- | 1.7 | 1.8 | 1.6 | 1.8 | 1.8 |
| Ac-D-Val- | 2.2 | 1.7 | 1.7 | 1.6 | — |
| Ac-Ile- | 2.2 | 1.9 | 2.1 | 1.8 | 2.1 |
| Ac-Phe- | 20 | 2.7 | 14 | 11 | 14 |
| Ac-Trp- | 14 | 2.5 | 11 | 18 | — |
| Ac-Tyr(Ac)- | 20 | 6 | 21 | 12 | — |
| Ac-D-Phe(4-Iodo)- | 15 | 5 | 14 | 10 | — |
| Ac-Tyr(Bzl)- | 20 | 16 | 20 | 8 | — |
| Ac-Tyr(DNP)- | 40 | 14 | 23 | 2.4 | — |
| Ac-Phe(4-NHDNP)- | 40 | 18 | 23 | 2.4 | — |
| DNP-Gly-D-Phe- | 15 | 7 | 14 | 5 | — |
| Dns-Gly-D-Phe- | 15 | 17 | 8 | 2.7 | — |

*In each instance, the acylating agent employed was the succinimide ester of the acyl group indicated.

It is claimed:

1. A proteolytic enzyme containing one or more amino acid residues per molecule selected from the group consisting of tyrosyl, lysyl, threonyl, seryl, histidyl, and cysteinyl residues, said enzyme being modified by one or more of said residues being acylated with an acyl group of the formula:

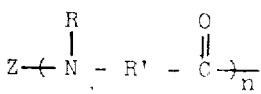

wherein Z is hydrogen or an organo blocking group, each

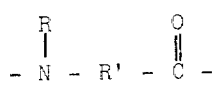

is an amino acid residue, and n is at least 1.

2. The modified enzyme of claim 1 wherein the enzyme is a neutral protease which contains one or more tyrosyl residues.

3. The modified enzyme of claim 2 wherein the enzyme contains at least one tyrosyl residue which is acylated at its phenolic oxygen site with said acyl group.

4. The modified enzyme of claim 2 wherein the enzyme is a bacterial protease.

5. The modified enzyme of claim 4 wherein the enzyme is a metalloprotease.

6. The modified enzyme of claim 4 wherein the enzyme is a zinc-containing protease.

7. The modified enzyme of claim 4 wherein the enzyme is a zinc and calcium-containing protease.

8. The modified enzyme of claim 1 wherein the enzyme is a neutral protease produced by a microorganism selected from the group consisting of Bacillus thermoproteolyticus, Bacillus subtilis, Bacillus megaterium, Aeromonas proteolytica, and Bacillus cereus.

9. The modified enzyme of claim 2 wherein

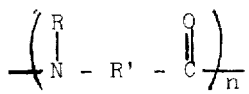

is a residue of one or more alpha-amino acids.

10. The modified enzyme of claim 2 wherein

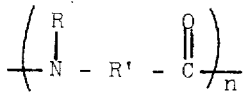

is a residue of one or more monocarboxylic alpha-amino acids, unsubstituted or substituted with one or more groups selected from the group consisting of acetyl, benzyl, dinitrophenyl, dinitrophenylamino, and iodo.

11. The modified enzyme of claim 2 wherein

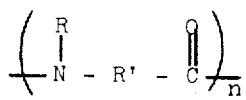

is selected from the group consisting of phenylalanyl, alanyl, valinyl, tryptophanyl, O-acetyltyrosyl, O-benzyltyrosyl, 0-2,4-dinitrophenyltyrosyl, 4-iodophenylalanyl, isoleucyl, 4-(dinitrophenylamino)-phenylalanyl, and glycyl-phenylalanyl.

12. The modified enzyme of claim 2 wherein Z contains 1 to 30 carbon atoms and is selected from the group consisting of hydrocarbyl, hydrocarbylcarbonyl, and hydrocarbylsulfonyl groups, unsubstituted or substituted with one or more substituents selected from the group consisting nitro, halo, dihydrocarbylamino, azo, and chelated or covalently bound metal substituents.

13. The modified enzyme of claim 12 wherein Z is aliphatic or aryl-substituted aliphatic.

14. The modified enzyme of claim 12 wherein the hydrocarbyl moiety of Z is alkyl or phenyl-substituted alkyl.

15. The modified enzyme of claim 2 wherein Z is selected from the group consisting of acetyl, β-phenylpropionyl, dinitrophenyl, and dansyl.

16. A neutral, bacterial, zinc-containing protease containing at least one tyrosyl residue per molecule, the phenolic oxygen of which is acylated with an acyl group of the formula

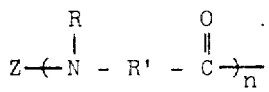

wherein Z is selected from the group consisting of acetyl, β-phenylpropionyl, dinitrophenyl, and dansyl, and

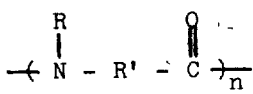

is selected from the group consisting of phenylalanyl, alanyl, valinyl, tryptophanyl, O-acetyltyrosyl, O-benzyltyrosyl, O-dinitrophenyltyrosyl, 4-iodophenylalanyl, isoleucyl, 4-(dinitrophenylamino)-phenylalanyl, and glycylphenyl-alanyl.

17. A method of increasing the hydrolase activity of a protease containing one or more amino acid residues per molecule selected from the group consisting of tyrosyl, lysyl, threonyl, seryl, histidyl, and cysteinyl residues comprising acylating said protease with an acylating agent of the formula:

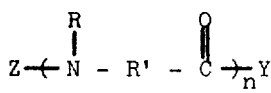

wherein Z is hydrogen or an organo blocking group, each

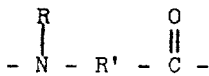

is an amino acid residue, n is at least 1, and Y is an organo group that is replaced by the protease molecule during the acylation reaction.

18. The method of claim 17 wherein Y is selected from the group consisting of

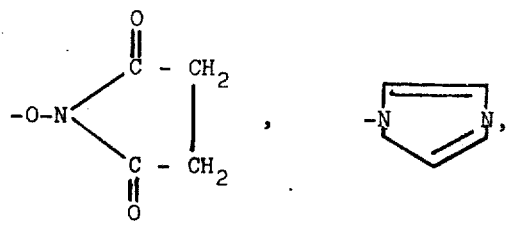

and

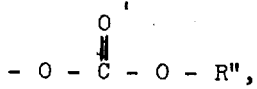

wherein R″ is alkyl of 1 to 7 carbon atoms.

19. The method of claim 17 wherein the enzyme is a neutral protease which contains one or more tyrosyl residues.

20. The method of claim 19 wherein the enzyme is a bacterial protease.

21. The method of claim 20 wherein the enzyme is a metalloprotease.

22. The method of claim 20 wherein the enzyme is a zinc-containing protease.

23. The method of claim 20 wherein the enzyme is a zinc and calcium-containing protease.

24. The method of claim 18 wherein the enzyme is a neutral protease produced by a microorganism selected from the group consisting of *Bacillus thermoproteolyticus*, *Bacillus subtilis*, *Bacillus megaterium*, *Aeromonas proteolytica*, and *Bacillus cereus*.

25. The method of claim 19 wherein

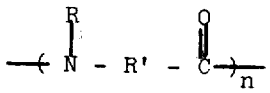

is a residue of one or more alpha-amino acids.

26. The method of claim 19 wherein

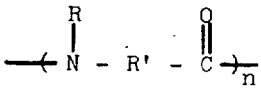

is a residue of one or more monocarboxylic alpha-amino acids, unsubstituted or substituted with one or more groups selected from the group consisting of acetyl, benzyl, dinitrophenyl, dinitrophenylamino, and iodo.

27. The method of claim 19 wherein

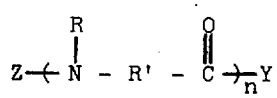

is selected from the group consisting of phenylalanyl, alanyl, valinyl, tryptophanyl, O-acetyltyrosyl, O-benzyltyrosyl, O-dinitrophenyltyrosyl, 4-iodophenylalanyl, isoleucyl, 4-(dinitrophenylamino)-phenylalanyl, and glycyl-phenylalanyl.

28. The method of claim 19 wherein Z contains 1 to 30 carbon atoms and is selected from the group consisting of hydrocarbyl, hydrocarbylcarbonyl, and hydrocarbylsulfonyl groups, unsubstituted or substituted with one or more substituents selected from the group consisting nitro, halo, dihydrocarbylamino, azo, and chelated or covalently bound metal substituents.

29. The method of claim 28 wherein Z is aliphatic or aryl-substituted aliphatic.

30. The method of claim 28 wherein the hydrocarbyl moiety of Z is alkyl or phenyl-substituted alkyl.

31. The method of claim 19 wherein Z is selected from the group consisting of acetyl, β-phenylpropionyl, dinitrophenyl, and dansyl.

32. A method of increasing the hydrolase activity of a neutral, bacterial, zinc-containing protease containing at least one tyrosyl residue per molecule, comprising acylating said protease with an acylating agent of the formula:

$$Z \!\!-\!\!\!\left(\!\! N\overset{R}{\underset{|}{{}}} - R' - \overset{O}{\underset{\|}{C}} \!\right)_{\!\!n}\!\! Y$$

wherein Z is selected from the group consisting of acetyl, β-phenylpropionyl, dinitrophenyl, and dansyl,

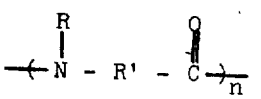

is selected from the group consisting of phenlalanyl, alanyl, valinyl, tryptophanyl, O-acetyltyrosyl, O-benzyltyrosyl, O-dinitrophenyltyrosyl, para-iodophenylalanyl, isoleucyl, para-(dinitrophenylamino)phenylalanyl, and glycyl-phenylalanyl, and Y is selected from the group consisting of and 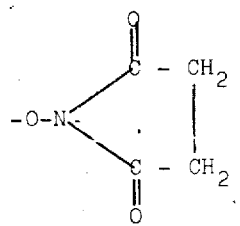, 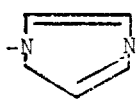, and
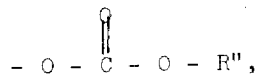
wherein R'' is alkyl of 2 to 4 carbon atoms.
* * * * *